(12) United States Patent
Kauppinen et al.

(10) Patent No.: US 9,032,905 B2
(45) Date of Patent: May 19, 2015

(54) APPARATUS AND METHOD FOR COATING GLASS SUBSTRATE

(75) Inventors: Sami Kauppinen, Helsinki (FI); Markku Rajala, Vantaa (FI)

(73) Assignee: BENEQ OY, Vantaa (FI)

( * ) Notice: Subject to any disclaimer, the term of this patent is extended or adjusted under 35 U.S.C. 154(b) by 0 days.

(21) Appl. No.: 13/702,527

(22) PCT Filed: Jun. 21, 2010

(86) PCT No.: PCT/FI2010/050523
§ 371 (c)(1),
(2), (4) Date: Dec. 6, 2012

(87) PCT Pub. No.: WO2011/161297
PCT Pub. Date: Dec. 29, 2011

(65) Prior Publication Data
US 2013/0078387 A1   Mar. 28, 2013

(51) Int. Cl.
| B05B 17/04 | (2006.01) |
| B05D 1/04 | (2006.01) |
| B05B 5/03 | (2006.01) |
| C03C 17/00 | (2006.01) |
(Continued)

(52) U.S. Cl.
CPC ............... B05B 17/04 (2013.01); B05B 7/0012 (2013.01); B05B 5/03 (2013.01); B05B 5/084 (2013.01); B05B 5/087 (2013.01); C03C 17/002 (2013.01)

(58) Field of Classification Search
CPC .......... B05B 5/03; B05B 17/04; B05B 5/084; B05B 5/08; B05B 1/04; B05B 1/045; B05B 7/0012; C03C 17/002
USPC ........... 427/475, 477, 483; 118/723 R, 723 E, 118/723 ER, 728, 690, 690.1, 704, 706, 118/708, 50.1, 620, 621, 625, 629; 204/164; 239/690, 690.1, 704, 706, 239/708
See application file for complete search history.

(56) References Cited

U.S. PATENT DOCUMENTS 3,791,579 A    2/1974 Cowan
5,110,618 A  * 5/1992 Faust ........................... 427/482
(Continued)

FOREIGN PATENT DOCUMENTS

CN     1093023 A    10/1994
CN     1638877 A    7/2005
(Continued)

OTHER PUBLICATIONS

International Search Report issued in International Application No. PCT/FI2010/050523 mailed Mar. 22, 2011.
(Continued)

*Primary Examiner* — Laura Edwards
(74) *Attorney, Agent, or Firm* — Oliff PLC

(57) ABSTRACT

An apparatus and method for coating a substrate using one or more liquid raw materials, includes: at least one atomizer for atomizing the one or more liquid raw materials into droplets, charging means for electrically charging the droplets during or after the atomization and a deposition chamber in which the droplets are deposited on the substrate, the deposition chamber being provided with one or more electric fields for guiding the electrically charged droplets on the substrate. According to the invention there is a charging chamber arranged upstream of the deposition chamber and provided with charging means for electrically charging the droplets.

16 Claims, 6 Drawing Sheets

(51) Int. Cl.
*B05B 7/00* (2006.01)
*B05B 5/08* (2006.01)

(56) References Cited

U.S. PATENT DOCUMENTS

| | | | |
|---|---|---|---|
| 5,378,285 A * | 1/1995 | Mitani et al. | 118/723 HC |
| 5,725,670 A * | 3/1998 | Wilson et al. | 118/629 |
| 6,349,668 B1 * | 2/2002 | Sun et al. | 118/723 R |
| 6,800,333 B2 * | 10/2004 | Choy et al. | 427/475 |
| 7,186,445 B2 * | 3/2007 | Putkisto et al. | 427/482 |
| 2009/0093105 A1 * | 4/2009 | Kobayashi et al. | 438/478 |
| 2010/0006027 A1 | 1/2010 | Yang et al. | |

FOREIGN PATENT DOCUMENTS

| | | |
|---|---|---|
| CN | 1913973 A | 2/2007 |
| CN | 101351273 A | 1/2009 |
| WO | WO 99/55466 A1 | 11/1999 |
| WO | WO 00/42234 A1 | 7/2000 |

OTHER PUBLICATIONS

International Preliminary Report on Patentability issued in International Application No. PCT/FI2010/050523 dated Oct. 8, 2012.
Chinese Office Action dated Dec. 3, 2014 issued in Chinese Patent Application No. 201080067579.3 (with translation).

* cited by examiner

APPARATUS AND METHOD FOR COATING GLASS SUBSTRATE

FIELD OF THE INVENTION

The present invention relates to an apparatus for coating a glass substrate and particularly to an apparatus for coating a glass substrate using one or more liquid raw materials. The present invention further relates to a method for coating a glass substrate and particularly to a method for coating a glass substrate using one or more liquid raw materials.

BACKGROUND OF THE INVENTION

It is generally know to use liquid starting materials for coating glass by atomizing the liquid starting materials into droplets and directing the formed droplets on the surface of glass to be coated for producing a coating. In other words according to the prior art the droplets are brought to the surface of the substrate to be coated as liquid droplets, whereby the coating is formed on the surface of the substrate such that first the droplets brought on the surface are pyrolyzed or the vaporizable substances of the droplets are vaporized for providing a coating on the surface of the substrate. An other prior art method for providing a coating on a glass substrate is to use a vapour deposition method in which the liquid starting materials are first atomized into liquid droplets and the liquid droplets are further vaporized such that vaporized starting materials react with the surface of the glass or with each other to form a coating on the surface of the glass.

The problem in the above identified prior art coating processes is uniformity of the produced coating as the distribution of the formed liquid droplets is difficult to control. In other words the uniformity of the produced coating depends on the uniform deposition of the droplets on the glass substrate or uniform distribution of the droplets as they are vaporized.

BRIEF DESCRIPTION OF THE INVENTION

An object of the present invention is to provide an apparatus for coating a glass substrate and a method for coating a glass substrate so as to overcome the above mentioned problems. The objects of the invention are achieved by an apparatus for coating a glass substrate characterized in that the apparatus comprises a charging chamber arranged upstream of the deposition chamber and provided with charging means for electrically charging the droplets. The objects of the present invention are further achieved with a method for coating a glass substrate characterized in that the method comprises electrically charging the droplets in a separate charging chamber arranged upstream of the deposition chamber before conduction the droplets to the deposition chamber.

The preferred embodiments of the invention are disclosed in the dependent claims.

The invention is based on the idea of coating a glass substrate using one or more liquid raw materials by first atomizing the one or more liquid raw materials into droplets using one or more atomizers and then electrically charging the droplets during or after the atomization. According to the present invention the droplets are electrically charged in a separate charging chamber before conducting the droplets to a deposition chamber for coating the glass substrate. The charging chamber is arranged upstream of the deposition chamber and the electrically charged droplets are conducted from the charging chamber to the deposition chamber in which the electrically charged droplets are guided towards the glass substrate using one or more electric fields.

An advantage in the present invention is that in a separate charging chamber the distribution of the droplets is homogenised as the electrical charge of the electrically charged droplets tends to push the electrically charged droplets away from each other. Thus, the electrical charge of the droplets provides a repulsion force between the charged droplets such that the distribution of the droplets tends to become homogenised. The separate charging chamber also gives time for the distribution of the droplets to become even as the charged droplets are conducted from the charging chamber to a deposition chamber. The present invention also has the advantage that the deposition chamber may be provided with two or more electric fields arranged adjacently and/or successively in the movement direction of the droplets and at least some of the electric fields may have different electric field strength for adjusting distribution of the electrically charged droplets in the deposition chamber.

BRIEF DESCRIPTION OF THE DRAWINGS

In the following the invention will be described in greater detail by means of preferred embodiments with reference to the accompanying drawings, in which.

DETAILED DESCRIPTION OF THE INVENTION

Figure 1:
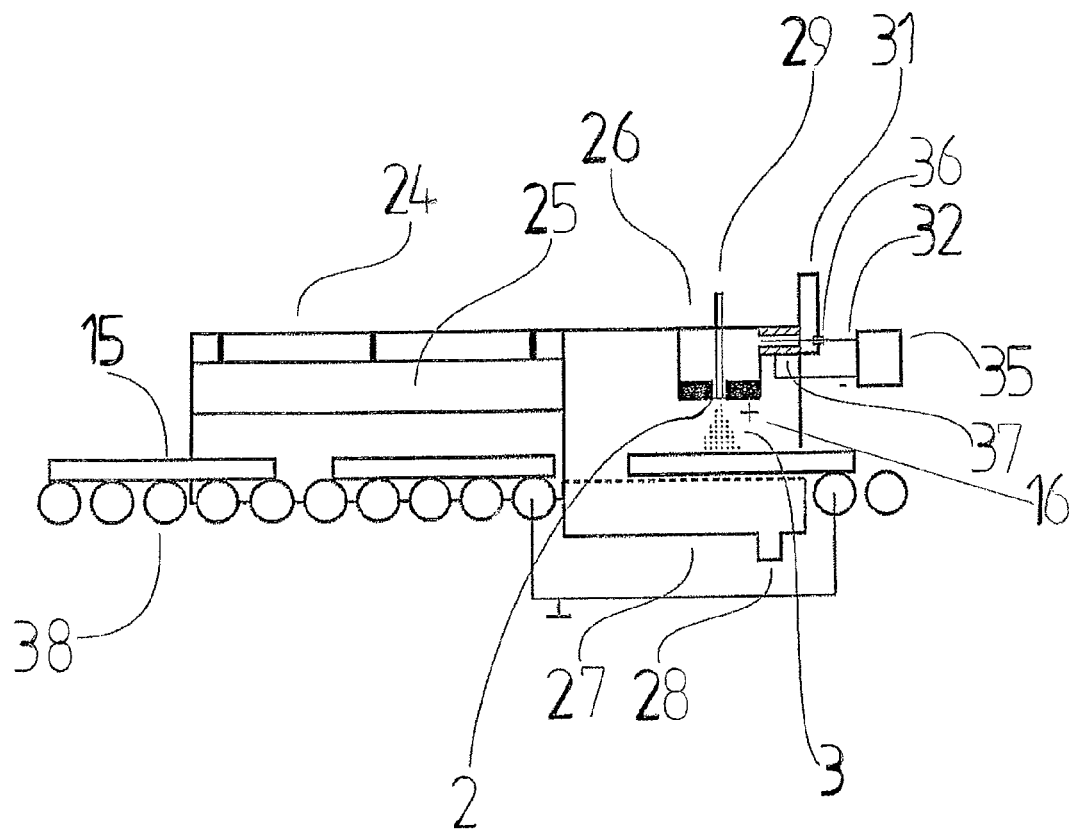
FIG. 1 shows schematically first embodiment of the present invention.

FIG. 1 shows, in principle, the first embodiment of the invention, where the formation of a coating on a of glass substrate 15 is carried out in a coating apparatus. Flat glass substrate 15, with a typical size of 1100 mm×1400 mm, moves from right to left. The glass substrate 15 first enters a heating furnace 24 including a heater 25. The heater 25 may be based on radiation, convection or similar. In the heating furnace 24 the glass substrate 15 heats to a temperature which is higher than the annealing point (annealing temperature) of the glass substrate 15. The annealing point depends on the composition of glass substrate 15 and is typically about 500° C. for soda-lime glass and about 1100° C. for fused silica. The glass substrate 15 then enters the coating unit 26 where droplets 3 are deposited on the glass substrate 15 or guided towards the glass substrate 15 in a deposition chamber 16. An air floating device 27 floats the glass substrate 15 by a gas blowing motion, the gas being fed through conduit 28. The droplets 3 are formed by a two-fluid atomizer 2. Precursor liquid is fed into the atomizer 2 through conduit 29 and atomizing gas is fed into the atomizer 2 through conduit 31. The atomizing gas passes a corona charger electrode 32 into which a high voltage is fed from the power source 35. The corona electrode 32 is separated from the casing of the coating unit 26 by an electrical insulator 36. The counter electrode 37 preferably forms a part of the charging nozzle, its surface forming the inner wall of the nozzle. When the atomizing gas flows via the corona electrode 32, it is electrically charged.

The corona charging makes it possible to attain high charge densities, an even charge field and minimizing of breakdown liability simultaneously. Furthermore, corona charging makes it possible to produce both positively and negatively charged droplets by means of the same apparatus.

In the atomizer 2 it is advantageous to use very high flow rate of the atomizing gas, advantageously from 50 m/s to sonic velocity. The high gas flow rate has several advantages. Firstly, it is very advantageous from the point of views of charging, because e.g. the created ions drift quickly away from the vicinity of the corona. This expulsion of the space charging caused by ions decreases the electric field attenuating the discharge and forming around the corona electrode 32 and thereby also the required corona voltage. For example by feeding nitrogen as atomizing gas through conduit 31 with a flow rate near the corona electrode 32 being roughly 150 m/s, it is possible to use approximately 5 kV as the charging voltage of the corona electrode 32. Secondly, the high flow rate reduces the ion loss to the surroundings of the atomizer 2, with a preferable residence time of the charged gas in the atomizer being 1 m/s or less. Thirdly, the high flow rate at the exit nozzle of the atomizer 2 reduces the droplet size.

Figure 2:
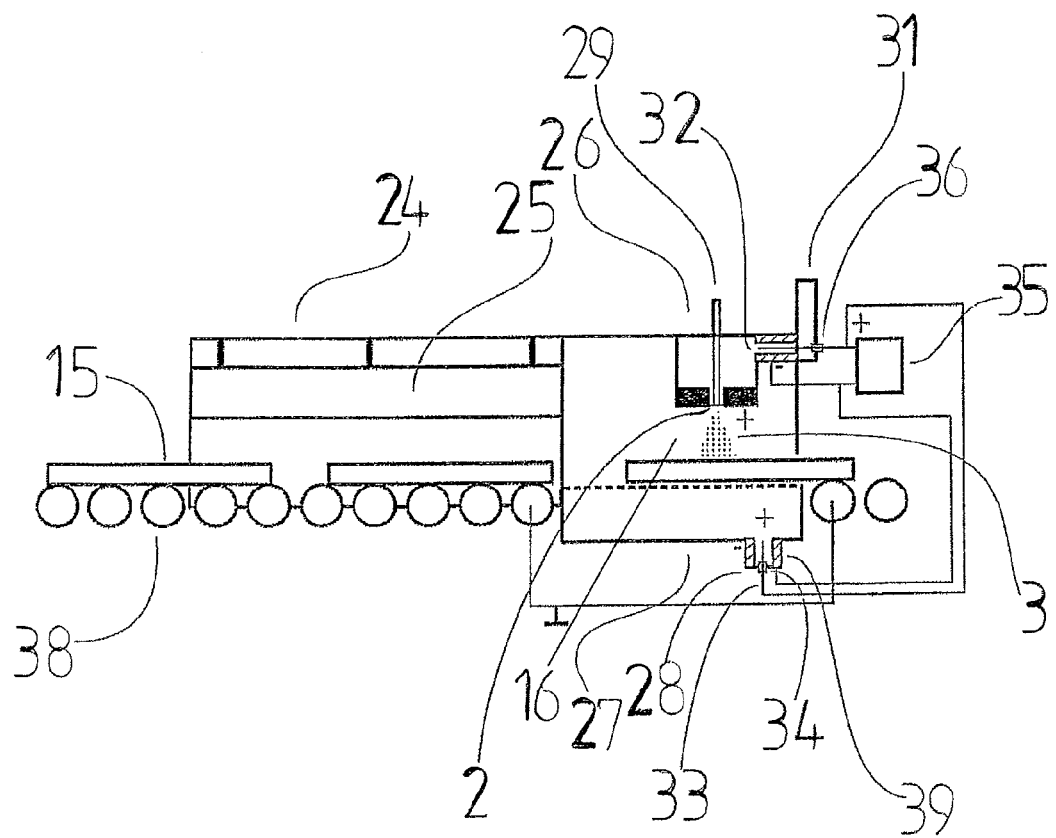
FIG. 2 shows schematically second embodiment of the present invention.

FIG. 2 shows, in principle, a second embodiment of the invention where the glass heating movement and coating is carried out in the same way as with the previous embodiment shown in FIG. 1. In addition a second corona charger 33 is used to charge the air used in the air floating device 27. The second corona electrode 33 is equipped with a second an electrical insulator 34 and with a second counter electrode 39. FIG. 2 shows an embodiment where the second corona charger 33 uses the same power supply 35 as the first corona charger 32. It is, however, obvious for a person skilled in the art that also another power supply, with different voltage, may be used. It is essential to the invention that the air supporting the glass substrate 15 charges the bottom surface of the glass substrate 15 with the same polarity as the droplets 3 are charged. The rejection force caused by the charges with same polarity decreases the formation of the coating to the bottom surface of the glass substrate 15. Obviously, also only a more restricted area of the glass substrate 15 may be charged.

Figure 3:
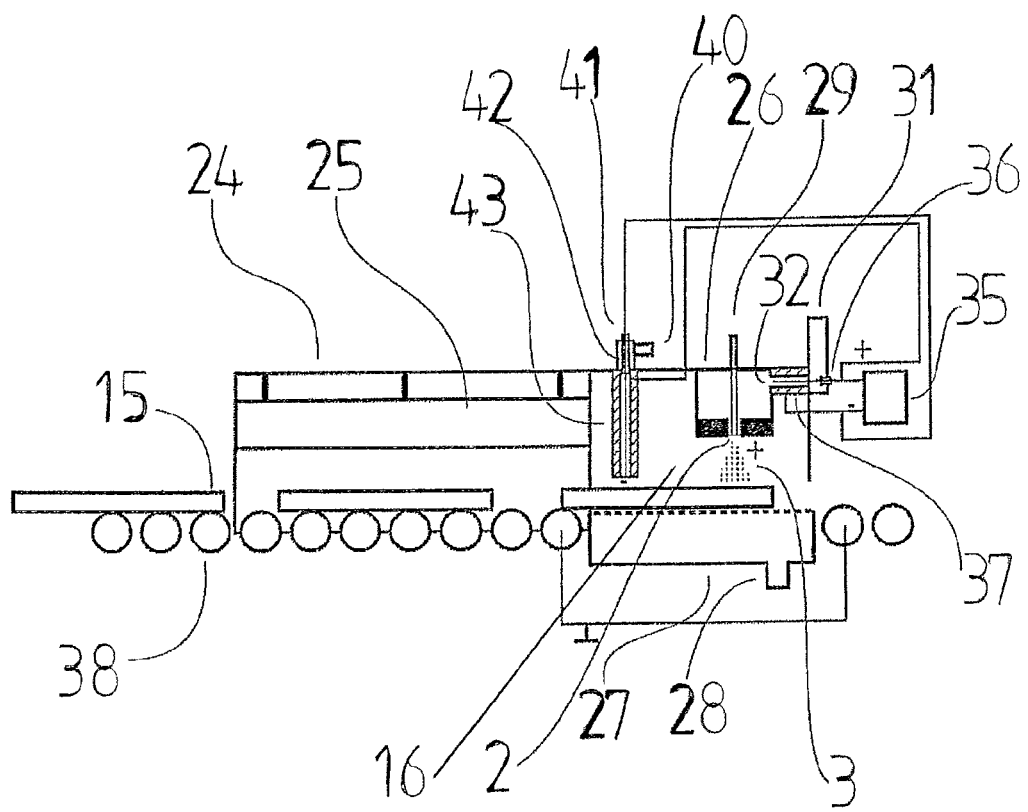
FIG. 3 shows schematically third embodiment of the present invention.

FIG. 3 shows, in principle, a third embodiment of the invention where the electrostatic forces for the droplet deposition and guiding are enhanced by charging the top surface of the glass substrate 15 with a charge opposite to the charge of the droplets 3. Preferably the charging is carried out by charging air passing through the conduit 40 by a third corona charger 41. The third corona charger 41 is provided a third electrical insulator 42 and with a third counter electrode 43. As shown in FIG. 3, the third corona charger 41 has an opposite polarity to the first corona charger 32. FIG. 3 shows an embodiment where the third corona charger 41 uses the same power supply 35 as the first corona charger 32. It is, however, obvious for a person skilled in the art that also another power supply, with different voltage, may be used.

Figure 4:
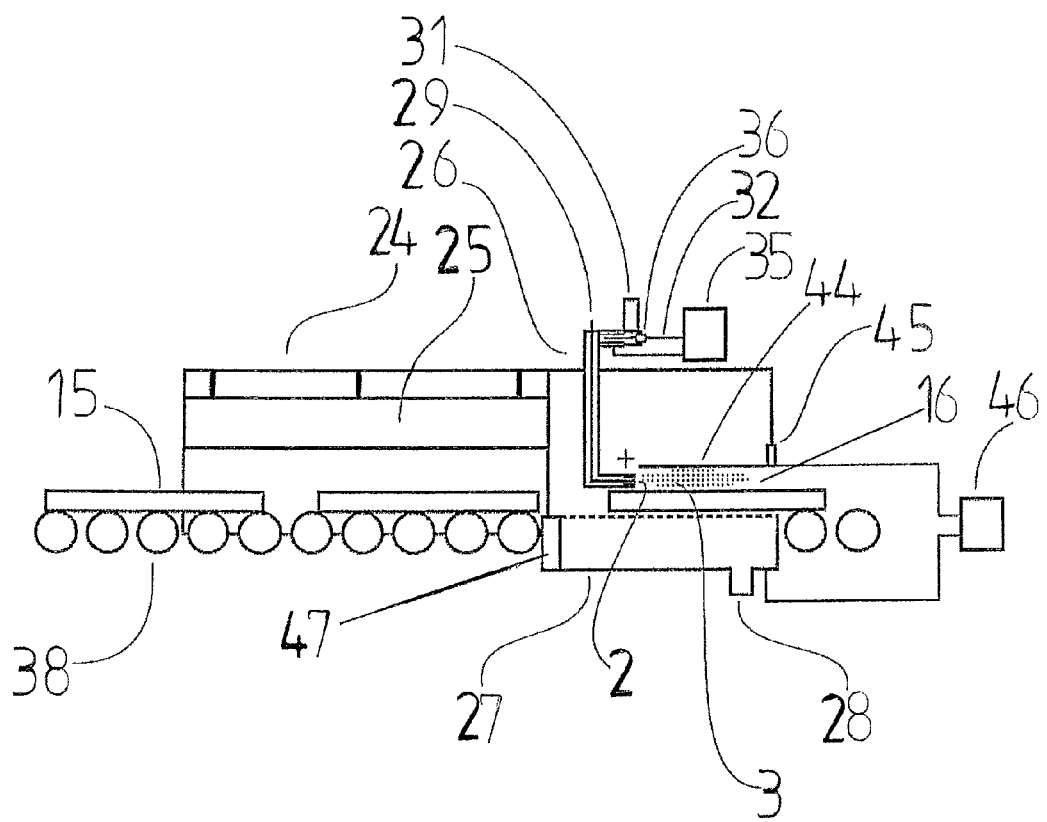
FIG. 4 shows schematically fourth embodiment of the present invention.

FIG. 4, shows, in principle, a fourth embodiment where a separate electric field is used to enhance the deposition or guiding of the charged droplets 3. The droplets 3 are charged similarly as described in the first embodiment. The high-velocity droplets 3 enter an electrical field generated between the first electrode 44, which is separated from the casing of the coating unit 26 by a fourth electrical insulator 45 and connected to the first output of the third power supply 46, and the second electrode which in this case is formed by connecting the air support device 27 to the other output of the third power supply 46 and electrically insulating the air support device 27 from the casing of the coating unit 26 by an fourth electrical insulator 47. It is obvious for a person skilled in the art that the third output of the power supply 46 may be connected to various other parts of the coating unit 26 as well, e.g. a separate second electrode or to one or more of the rollers 38 (electrically insulated from the other parts of the apparatus) which in turn connect the second output of the third power supply 46 to the glass substrate 15 touching the roller.

The corona discharge electrode and its counter electrode may be positioned in various different ways not described in the previous embodiments. Thus it is e.g. possible to connect the counter electrode to the glass substrate, to the coating formed on the glass substrate or to a plate outside the glass substrate.

In FIGS. 1 to 4 it is described that the atomizer 2 is a two-fluid atomizer and the droplets 3 are charged during atomization by charging the atomizing gas using one or more first corona electrodes 32. However, it is possible also to use some other kind of atomizer, such as ultra sonic atomizers. Furthermore, in an alternative embodiment the liquid starting materials are first atomized into droplets using one form more atomizers 2 and then the formed droplets 3 are further charged after the atomization using one or more corona electrodes. Therefore, in the embodiments shown in FIGS. 1 to 4 the apparatus is further provided with one or corona electrodes arranged such that the formed droplets 3 are conducted past the one or more corona electrodes. the one or more corona electrodes charge the droplets 3 as they are conducted past them.

The charged droplets 3 are also preferably guided towards or on the glass substrate 15 using a separate electric field provided between a first and second electrode. The separate electric field is preferably provided inside a deposition chamber 16 for guiding the charged droplets 3 towards the glass substrate 15. The charged droplets 3 may be deposited on a glass substrate 15 as liquid droplets or alternatively the charged droplets may be vaporized before the starting materials react on the glass substrate 15 or before the droplets contact the glass substrate 15 such that the vaporized starting material react on the glass substrate 15.

Figure 5:
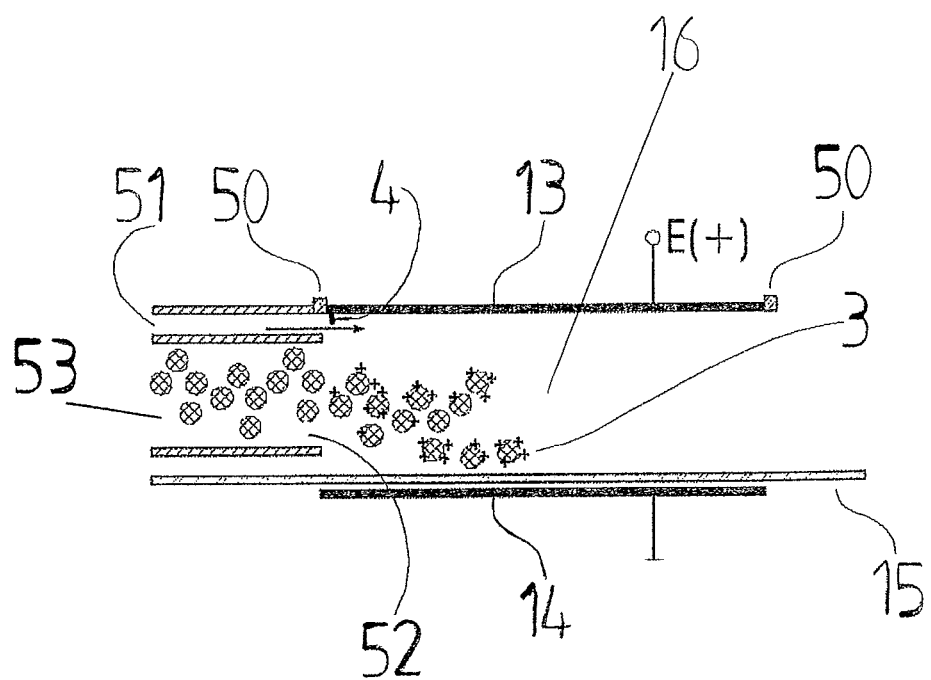
FIG. 5 shows schematically one embodiment of a deposition chamber of the present invention.

FIG. 5 shows one embodiment of the present invention in which the liquid starting materials are first atomized into droplets 3 using one or more atomizers 2. The atomizers 2 may be two-fluid atomizers or some other kind of atomizers. As shown in FIG. 5 the liquid starting materials are atomized upstream of the deposition chamber 16 and the formed droplets 3 are conducted to the deposition chamber 16 via conduit 53 and inlet 52. The liquid starting materials may be atomized in a separate atomizing chamber (not shown) or at the conduit 53 or at the inlet 52 of the deposition chamber 16. The formed droplets 3 are conducted to the deposition chamber 16 preferably using at least one carrier gas such that the carrier gas and the droplets 3 together form an aerosol. The mentioned aerosol is preferably supplied to the deposition chamber 16 as laminar aerosol flow. The laminar aerosol flow preferably has Reynolds number under 2000.

The droplets 3 entering the deposition chamber are electrically charged using one or more charging means. The charging means may comprise one or more corona electrodes 4 which electrically charge the droplets 3 as they pass the corona electrodes 4. Alternatively the charging means may comprise one or more blow charger supplying electrically charged gas for charging the droplets 3. As shown in FIG. 5, the corona electrode 4 is arranged inside the deposition chamber 16 close to the inlet 52 through which the droplets 3 enter the deposition chamber 16. In an alternative embodiment the corona electrode 4 or other charging means may be arranged in connection with an inlet 52 of the deposition chamber 16 through which inlet 52 the droplets 3 are supplied into the deposition chamber 16, or immediately upstream of the deposition chamber 16. In FIG. 5 the corona electrode 4 is an elongated corona electrode 4 extending transversely to the movement direction of the droplets 3. The charging means may also comprise one or more elongated corona electrode 4 extending parallel to the movement direction of the droplets 3 or several separate corona electrodes 4 distributed substantially evenly spaced apart. When there are two or more separate corona electrodes 4 at least some of the corona electrodes may have different corona voltage for providing the droplets 3 with different electrical charge in different part of the deposition chamber 16. Also shown in FIG. 5 is a gas conduit 51 through which a protective gas stream is provided between the corona electrode 4 and the droplets 3. The protective gas stream may be some inert gas and it is preferably heated to temperature higher than the temperature of the droplets 3. The protective gas stream prevents the droplets 3 from contacting the corona electrode 4.

In an alternative embodiment the atomizer 2 is arranged inside the deposition chamber 16, as in FIG. 1. The atomizer 2 may be a two-fluid atomizer, and that the charging means 32 are arranged to charge at least a fraction of the gas used in the two-fluid atomizer 2 for electrically charging the droplets 3 during the atomization. The droplets 3 may also be charged after the atomization using one or more separate corona electrodes 4 or a blow charger.

The electrically charged droplets 3 are further guided towards a glass substrate 15 or on the glass substrate 15 using one or more electric fields provided in the deposition chamber 16. The one or more electric fields is provided between opposite electrodes 13, 14 in the deposition chamber 16 and between which electrodes 13, 14 the glass substrate 15 is positioned in the deposition chamber 16. In FIG. 5 the electric field is provided by a first electrode 13 and a second electrode 14 between which an electric field is formed. The electric field guides the electrically charged droplets by electrical forces towards the glass substrate 15 arranged between the first and second electrode 13, 14 in the deposition chamber. In FIG. 5 the first electrode is electrically separated from the rest of the apparatus by electrical insulators 50. In FIG. 5 the first electrode has a positive voltage, but it may also have negative voltage. The glass substrate 15 may also be provided as the second electrode 14, as described earlier. The apparatus may also comprise two or more electric fields arranged adjacently and/or successively in the movement direction of the droplets 3. At least some of these adjacent and/or successive electric fields may have same or different electric field strength for adjusting distribution of the electrically charged droplets 3. Using two or more adjacent and/or successive electric fields, the field of which extends transversely to the movement direction of the charged droplets, the distribution or flux of charged droplets in the deposition chamber may be altered or controlled by adjusting the electric field strength of the electric fields separately. This enables controlling the amount of deposition in different parts of the deposition chamber and on the glass substrate.

According to the above mentioned the droplets 3 are first electrically charged and then guided towards the glass substrate using one or more electric fields provided inside the deposition chamber 16. In one embodiment the droplets 3 guided towards the glass substrate using electrical forces are vaporized before the starting materials react on the surface of the substrate 15 or before the droplets 15 contact the glass substrate. Thus the electrically guided droplets are conducted to a thermal reactor (not shown) before they react on the glass substrate 15 or before the droplets 3 contact the glass substrate 15. Thus the thermal reactor is preferably provided close to the glass substrate 15. The thermal reactor may a flame generated by combustion gas and oxidizing gas or plasma provided by means of gas. Alternatively the thermal reactor may be hot zone provided with heating means, such as electric heating means, electric resistors, inside the deposition chamber 16. The hot zone may also be provided by thermal energy of the substrate 15. The glass substrate 15 may be heated or it may come from manufacturing step, such as tin path or annealing lehr, in which the glass substrate is in elevated temperature. The thermal energy of the glass substrate 15 vaporizes the charged and guided droplets 3 close to the surface of the substrate 15 before the starting materials react on the surface of the substrate 15. Thus the vaporized starting materials react on the glass substrate 15.

Alternatively the droplets 3 are deposited on the glass substrate 15 as droplets.

Figures 6A, 6B:
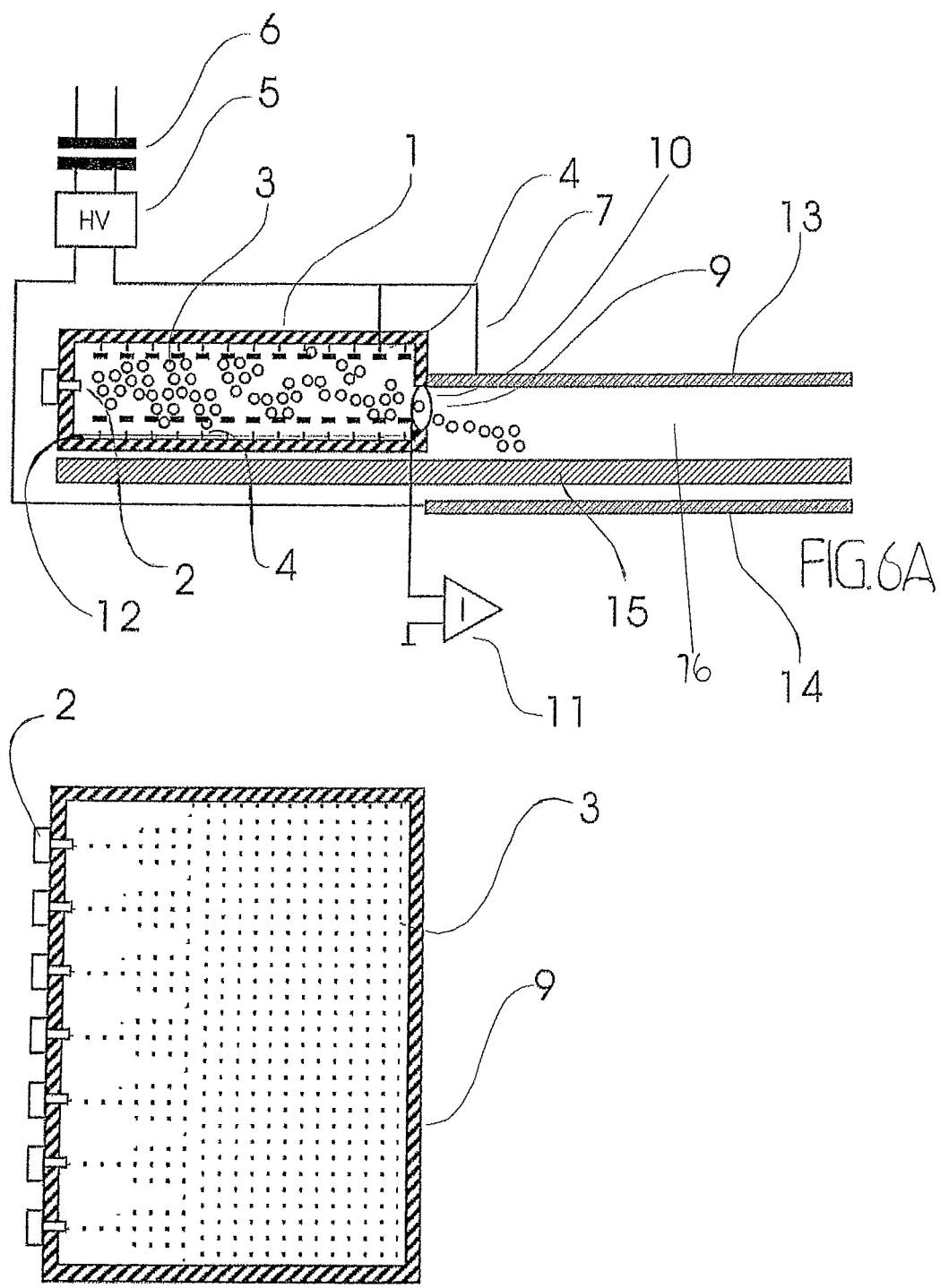
FIGS. 6A and 6B show schematically one embodiment of a charging chamber of the present invention.

FIGS. 6A and 6b show another embodiment in which droplets 3 are electrically charged in a separate charging chamber 1 upstream of the deposition chamber 16. The charging chamber 1 is provided with one or more atomizers 2, which may two-fluid atomizers or some other type of atomizers for atomizing the liquid starting materials into droplets 3. The charging chamber 1 is insulated such that external heat, for example from hot glass substrate does heat the charging chamber 1 to prevent the droplets 3 from vaporizing. The atomizers 2 may be provided inside or upstream the charging chamber 1 or in fluid connection with the charging chamber 1 such that the formed droplets 3 may be conducted in the charging chamber 1.

The charging chamber 1 is provided with charging means 4 for electrically charging the droplets 3 after the atomization. In FIG. 6A the charging means comprise several separate corona electrodes 4 distributed substantially evenly on at least one wall of the charging chamber 1. Alternatively the charging means may comprise one or more elongated corona electrodes 4 extending transversely or parallel to the movement direction of the droplets 3 for charging the droplets 3. When there are two or more corona electrodes 4, at least some of the corona electrodes 4 may have a different corona voltage for providing the droplets 3 with different electrical charge in different parts of the charging chamber 1. The corona electrodes are preferably arranged such that a high concentration of ions may be provided close to the inner walls of the charging chamber 1. In FIG. 6A the corona of the corona electrode is generated using a high voltage power supply 5, which is galvanic separated with an isolation transformer 6.

The charging chamber 1 may also comprise one or more blow chargers (not shown) supplying electrically charged gas for electrically charging the droplets 3. The atomizers 2 may also be two-fluid atomizers, and that the charging means are arranged to charge at least a fraction of the gas used in the two-fluid atomizer 2 for electrically charging the droplets 3, as discussed earlier.

In the charging chamber 1 the electrically charged droplets 3 tend to repel each other due to the electrical repulsion forces of the droplets 3 charged with the same electrical polarity. Thus the distribution of the charged droplets 3 is homogenized which is advantageous for providing a homogenized flux of droplets 3, as shown in FIG. 6B. Therefore charging chamber 1 enables the distribution of the charged droplets 3 to homogenize. The charging chamber 1 provides additional time for the repulsion forces to act for achieving the homogenizing effect. The electrical repulsion force between the electrically charged droplets causes some droplets 3 to contact the inner walls of the charging chamber 1. The droplets 3 colliding against the inner walls of the charging chamber 1 flow to the bottom of the charging chamber 1 and generate a layer 12 of liquid starting materials to the bottom of the charging chamber 1. The starting materials of the liquid layer 12 may be circulated back and used again.

The charging chamber 1 is provided with an outlet 9 through which the charged droplets 3 are conducted out of the charging chamber 1 and into the deposition chamber 16. The outlet 9 corresponds essentially the inlet 52 of FIG. 5. The outlet 9, or the inlet 52, may be provided with a charge meter comprising a sensor 10 and an electrometer 11 for measuring the electrical charge, and thus material flux of the starting materials, passing through the outlet 9 and leaving the charging chamber 1. These measurements may be conducted in real time. This measurement, the charge meter, may also be provided to the inlet 52 of the deposition chamber 16 and/or to an outlet (not shown) of the deposition chamber 16 for measuring the charge flow into the deposition chamber 16 and correspondingly out of the deposition chamber 16.

From the charging chamber 1 the charged droplets are conducted to the deposition chamber 16 via the outlet 9. The charging chamber 1 is arranged spaced apart from and in fluid connection with the deposition chamber 16. The electrically charged droplets 3 may be conducted using a carrier gas which together with the droplets 3 forms an aerosol as described in connection with FIG. 5. Thus the aerosol may be conducted for example same way as in the embodiment of FIG. 5. The deposition chamber 16 may also be constructed to substantially correspond the deposition chamber 16 of FIG. 5. The deposition chamber 16 is provided with a first electrode 13 and a second electrode 14 for provided an electric field between the opposite first and second electrode 13, 14. The deposition chamber may also be provided with two or more electric fields. The two or more electric fields may be arranged adjacently and/or successively in the movement direction of the electrically charged droplets 3 inside the deposition chamber 16 and at least some of the electric fields have different electric field strengths for adjusting distribution of the electrically charged droplets 3 in the deposition chamber 16.

The glass substrate 15 is positioned in the deposition chamber 16 between the first and second electrodes 13, 14. The electric field guides the electrically charged droplets 3 by electrical forces towards the glass substrate 15 arranged between the first and second electrode 13, 14 in the deposition chamber. The glass substrate 15 may also be provided as the second electrode 14, as described earlier. According to the above mentioned the droplets 3 are first electrically charged in the charging chamber 1, conducted to the deposition chamber 16 and then guided towards the glass substrate 15 using one or more electric fields provided inside the deposition chamber 16. In one embodiment the droplets 3 guided towards the glass substrate 15 using electrical forces are vaporized before the starting materials react on the surface of the substrate 15 or before the droplets 15 contact the glass substrate. Thus the electrically guided droplets are conducted to a thermal reactor (not shown) before they react on the glass substrate 15 or before the droplets 3 contact the glass substrate 15. Thus the thermal reactor is preferably provided close to the glass substrate 15. The thermal reactor may be a flame generated by combustion gas and oxidizing gas or plasma provided by means of gas. Alternatively the thermal reactor may be a hot zone provided with heating means, such as electric heating means, for example electric resistors, inside the deposition chamber 16. The hot zone may also be provided by thermal energy of the substrate 15. The glass substrate 15 may be heated or it may come from manufacturing step, such as tin path or annealing lehr, in which the glass substrate 15 is in an elevated temperature, as described in connection with FIGS. 1 to 4. The thermal energy of the glass substrate 15 vaporizes the charged and guided droplets 3 close to the surface of the substrate 15 before the starting materials react on the surface of the substrate 15. Thus the vaporized starting materials react on the glass substrate 15.

Alternatively the droplets 3 are deposited on the glass substrate 15 as droplets.

It will be obvious to a person skilled in the art that, as the technology advances, the inventive concept can be implemented in various ways. The invention and its embodiments are not limited to the examples described above but may vary within the scope of the claims.

The invention claimed is:

1. An apparatus for coating a glass substrate using one or more liquid raw materials, the apparatus comprising:
at least one atomizer for atomizing the one or more liquid raw materials into droplets;
charging means for electrically charging the droplets during or after the atomization;
a deposition chamber providing a coating on the glass substrate;
a separate charging chamber that is arranged upstream of the deposition chamber, wherein
the charging chamber is provided with one or more atomizers for forming the droplets into the separate charging chamber by atomizing the one or more liquid raw materials into the separate charging chamber with the one or more atomizers,
the charging chamber is provided with the charging means for charging the droplets,
the distribution of the charged droplets is homogenized in the charging chamber before conducting the charged droplets to the deposition chamber, and
the homogenized distribution of electrically charged droplets is provided to the deposition chamber from the charging chamber; and
one or more electric fields provided between first and second electrodes,
wherein the one or more electric fields guides the electrically charged droplets towards the glass substrate, and
the one or more electric fields provided between first and second electrodes is arranged in the deposition chamber.

2. An apparatus according to claim 1, wherein the charging chamber is arranged spaced apart from and in fluid connection with the deposition chamber.

3. An apparatus according to claim 1, wherein the atomizer is a two-fluid atomizer, and that the charging means are arranged to charge at least a fraction of the gas used in the two-fluid atomizer for electrically charging the droplets, or that the charging means comprises a blow charger supplying electrically charged gas into the charging chamber for charging the droplets, or that the charging means are arranged in the charging chamber for electrically charging the droplets, or that the charging means comprise one or more corona electrodes for electrically charging the gas used in the two-fluid atomizer or the formed droplets.

4. An apparatus according to claim 3, wherein the charging chamber comprises one or more elongated corona electrode extending transversely or parallel to the movement direction of the droplets, or that the charging chamber comprises several separate corona electrodes distributed substantially evenly on at least one wall of the charging chamber.

5. An apparatus according to claim 4, wherein at least some of the corona electrodes has a different corona voltage for providing the droplets with different electrical charge in different parts of the charging chamber.

6. An apparatus according to claim 1, wherein the charging chamber comprises one or more outlet openings through which the electrically charged droplets are guided out of the charging chamber and into the deposition chamber.

7. An apparatus according to claim 1, wherein the apparatus comprises charge meter for metering the electrical charge leaving the charging chamber with droplets, or that the apparatus comprises charge meter for metering the electrical charge leaving the charging chamber with droplets, the charge meter being arranged between the charging chamber and the deposition chamber or to the outlet opening of the charging chamber or to the inlet opening of the deposition chamber.

8. An apparatus according to claim 1, wherein:
the one or more electric fields is provided between opposite electrodes in the deposition chamber and between which electrodes the substrate is positioned in the deposition chamber, or
the one or more electric fields comprises two or more electric fields that are provided between opposite electrodes in the deposition chamber and between which electrodes the substrate is positioned in the deposition chamber, the two or more electric fields being arranged adjacently and/or successively in the movement direction of the droplets inside the deposition chamber, and/or
the one or more electric fields is provided between opposite electrodes in the deposition chamber and between which electrodes the substrate is positioned in the deposition chamber, at least some of the electric fields having a different electric field strength for adjusting distribution of the electrically charged droplets in the deposition chamber.

9. An apparatus according to claim 1, wherein the apparatus further comprises a thermal reactor provided in the deposition chamber for vaporizing the droplets before the starting materials react on the surface of the substrate.

10. A method for coating a glass substrate using one or more liquid raw materials, the method comprising:
atomizing the one or more liquid raw materials into droplets;
electrically charging the droplets during or after the atomization with charging means in a separate charging chamber arranged upstream of a deposition chamber, wherein the one or more liquid raw materials are atomized into the separate charging chamber with at least one atomizer provided with the charging chamber such that the droplets are formed into the separate charging chamber;
homogenizing the distribution of the e electrically charged droplets in the charging chamber to form a homogenized flux of electrically charged droplets;
conducting the homogenized flux of electrically charged droplets to the deposition chamber from the charging chamber; and
guiding the electrically charged droplets towards the glass substrate in the deposition chamber by using one or more electric fields that are provided between a first and second electrode in the deposition chamber.

11. A method according to claim 10, wherein the one or more liquid raw materials are atomized inside the charging chamber.

12. A method according to claim 10, wherein the one or more liquid raw materials are atomized with at least one two-fluid atomizer and at least a fraction of the gas used in the two-fluid atomizer is electrically charged for electrically charging the droplets, or by the droplets are electrically charged inside the charging chamber.

13. A method according to claim 12, wherein the droplets are electrically charged using one or more corona electrodes, or wherein the droplets are electrically charged inside the charging chamber using different corona voltage in at least some of the corona electrodes for providing the droplets with different electrical charge in different parts of the charging chamber, or wherein electrically charged gas is supplied into the charging chamber for electrically charging the droplets.

14. A method according to claim 10, wherein the charge leaving the charging chamber with the droplets is metered by using a charge meter, or wherein charge leaving the charging chamber with the droplets is metered by using a charge meter arranged between the charging chamber and the deposition chamber or at the outlet opening of the charging chamber or at the inlet opening of the deposition chamber.

15. A method according to claim 10, wherein:
the electrically charged droplets are guided on the substrate with one or more electric fields provided with opposite first and second electrodes in the deposition chamber, between which first and second electrodes the substrate is positioned in the deposition chamber, or
the electrically charged droplets are guided on the substrate with two or more electric fields provided with opposite first and second electrodes in the deposition chamber, between which first and second electrodes the substrate is positioned in the deposition chamber, the two or more electric fields being arranged adjacently and/or successively in the movement direction of the electrically charged droplets inside the deposition chamber, or
the electrically charged droplets are guided on the substrate with two or more electric fields provided with opposite first and second electrodes in the deposition chamber, between which first and second electrodes the substrate is positioned in the deposition chamber, the two or more electric fields having a different electric field strength for adjusting distribution of the electrically charged droplets in the deposition chamber, or
the electrically charged droplets are guided on the substrate with two or more electric fields provided with opposite first and second electrodes in the deposition chamber, between which first and second electrodes the substrate is positioned in the deposition chamber, the two or more electric fields being arranged adjacently and/or successively in the movement direction of the electrically charged droplets inside the deposition chamber and having a different electric field strength for adjusting distribution of the electrically charged droplets in the deposition chamber.

16. A method according to claim 10, wherein the droplets are vaporized in the deposition chamber before the starting materials react on the surface of the substrate.

* * * * *